Figure 1:
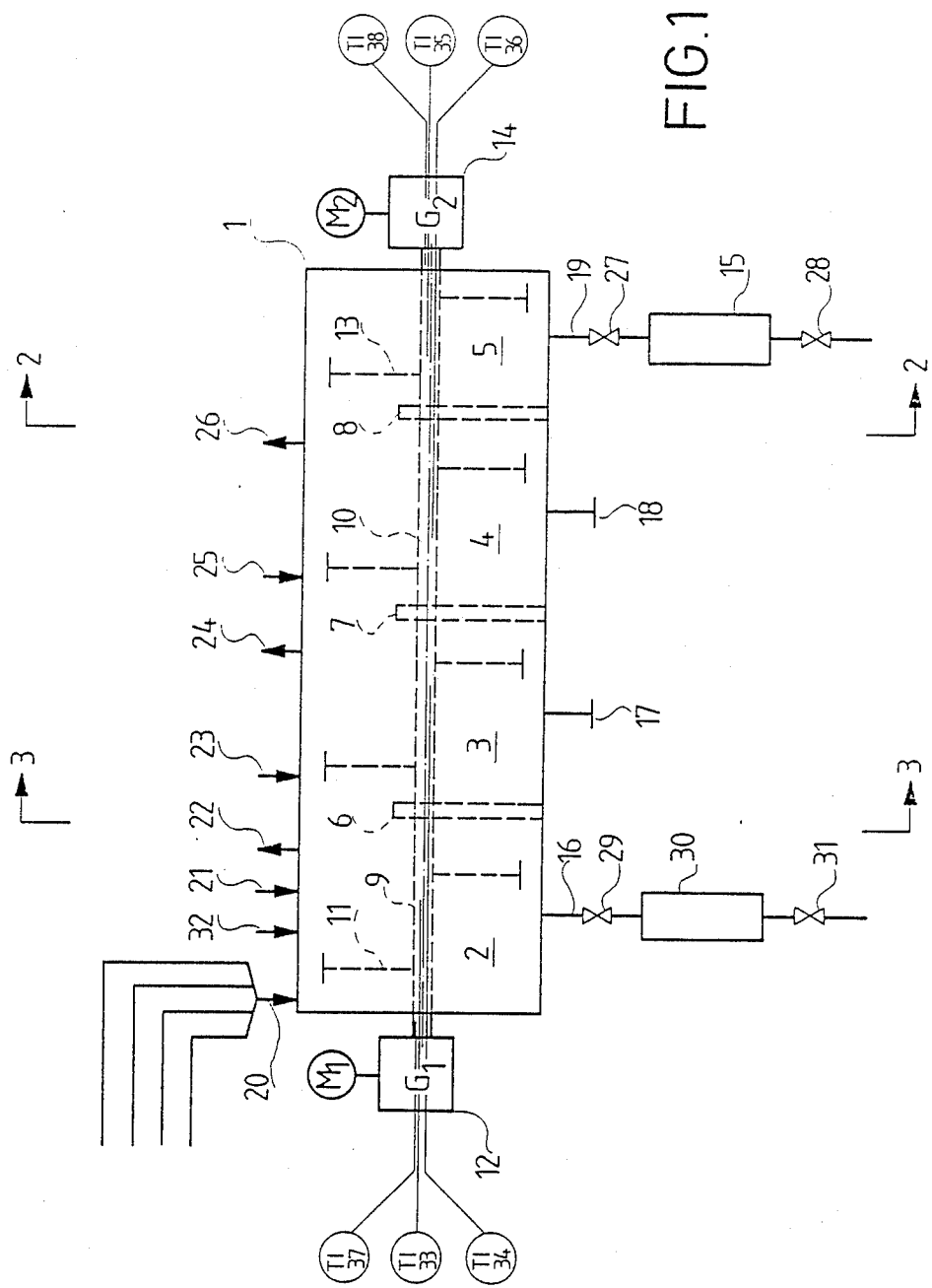

United States Patent [19]

Hennig et al.

[11] Patent Number: 4,729,877

[45] Date of Patent: Mar. 8, 1988

[54] APPARATUS FOR THE SOLID-BED POLYMERIZATION OF MONOMERS

[75] Inventors: Karl Hennig, Hessheim; Karlheinz Messmer, Weisenheim; Guenter Hoerdt, Grossniedesheim; Gerhard Kleinpeter, Lambsheim; Werner Hoffmann, Beindersheim; Hans-Juergen Raubenheimer, Ketsch, all of Fed. Rep. of Germany

[73] Assignee: Basf Aktiengesellschaft, Ludwigshafen, Fed. Rep. of Germany

[21] Appl. No.: 852,569

[22] Filed: Apr. 16, 1986

[30] Foreign Application Priority Data

Apr. 20, 1985 [DE] Fed. Rep. of Germany ....... 3514367

[51] Int. Cl.[4] .......................... B01F 3/08; B01F 9/02; B01J 14/00
[52] U.S. Cl. ................................ 422/134; 422/135; 422/136; 422/137; 422/225; 422/209
[58] Field of Search ............... 422/130, 131, 136, 135, 422/137, 138, 193, 200, 209, 210, 225

[56] References Cited

U.S. PATENT DOCUMENTS

| 1,871,416 | 8/1932 | Broadfield | 422/225 |
| 2,908,556 | 10/1959 | Watson et al. | 422/193 |
| 3,220,804 | 11/1965 | Bachmann et al. | 422/209 |
| 3,251,657 | 5/1966 | Bachmann et al. | 422/137 |
| 3,256,068 | 6/1966 | Burke, Jr. et al. | 422/225 |
| 4,277,585 | 7/1981 | Fournel et al. | 422/135 |

FOREIGN PATENT DOCUMENTS 2556418 3/1985 Fed. Rep. of Germany.
1525978 9/1978 United Kingdom.

Primary Examiner—Michael S. Marcus
Attorney, Agent, or Firm—Keil & Weinkauf

[57] ABSTRACT

A horizontal solid-bed polymerization reactor which is divided into a plurality of zones, for example a reaction zone, an after-reaction zone, a heating zone and a product discharge zone and possesses inlet and outlet openings for feeding substances into the zones and/or removing substances from the zones, the zones being separated from one another over a part of the reactor cross-section by means of weirs, wherein two drive shafts which are independent of one another and possess mixing elements are introduced into the solid-bed polymerization reactor in the middle.

3 Claims, 3 Drawing Figures

APPARATUS FOR THE SOLID-BED POLYMERIZATION OF MONOMERS

The present invention relates to a horizontal solid-bed polymerization reactor which is divided into a plurality of zones, for example a reaction zone, a subsequent reaction zone, a heating zone and a product-discharge zone, and has inlet and outlet openings for feeding substances into the zones and/or removing substances from the zones, the zones being separated from one another over a part of the reactor cross-section by means of weirs.

German Pat. No. 2,556,418 discloses a reactor of the type stated at the outset which is used for vapor-phase polymerization. Although this reactor is divided into sections, the stirring conditions over the entire reactor length cannot be altered because the driveshaft is continuous. Its use is therefore restricted, and can be used only for the preparation of water-insoluble polymers by the method of vapor-phase polymerization.

Furthermore, this reactor does not permit the holdup or the degree of mixing to be altered during operation.

It is an object of the present invention to provide a universal reactor which is not restricted just to vapor-phase polymerization and makes it possible to produce solid, water-soluble or water-swellable polymers in high yield and in the form of free-flowing products, which can be used, for example, as dispersants, paper auxiliaries, textile assistants or detergents.

We have found that this object is achieved, according to the invention, if two independent drive shafts possessing mixing elements are inserted into the middle of the solid-bed polymerization reactor. By means of these mixing elements and the different speeds of the two shafts, the polymer powder is kept in different states of agitation over the entire length of the solid-bed polymerization reactor, with the result that the course of the polymerization, the neutralization, the after-polymerization and heating can be controlled.

The following zones of the reactor are subjected to only slight radial mixing by means of a second shaft which is independent of the first and likewise possesses transverse paddles, so that a type of plug flow occurs and the heating effect is achieved over a long residence time of several hours and the residual monomer content is thus further decreased.

In an advantageous embodiment of the invention, the free cross-section of the weirs described at the outset can be changed, with the result that, through a change in the solid holdup, the residence time, in particular the heating time in the heating zone and hence also the yield of polymer are influenced.

According to the invention, the weirs are arranged rotatably. This ensures that the stated change in the solid holdup can be effected during operation, and furthermore the solid-bed polymerization reactor can be emptied in a simple manner by rotating the opening downward.

In a preferred embodiment of the invention, temperature sensors for the individual zones are mounted in the drive shafts. They permit the temperature of the polymer in the solid-bed polymerization reactor to be monitored when the individual zones of the said reactor are maintained at different temperatures. This method of heating at different temperatures is preferably used for controlling the polymerization rate, the mean molecular weight and the yield of the polymer.

In another particularly advantageous embodiment of the invention, two or more driveshafts are arranged coaxially, so that one end of the solid-bed polymerization reactor can be equipped with an inspection window arranged in the end opposite the drive side, the said inspection window being intended for observation of the stirred bed. Moreover, this free side also permits rapid cleaning of the solid-bed polymerization reactor.

The invention therefore provides a reactor which can be used for converting a polymerizable monomer or a polymerizable monomer mixture to polymers in an efficient manner.

The polymerization is carried out in a powder bed, i.e. a powder is initially taken in the horizontal fixedbed polymerization reactor. Suitable powders are both inorganic and organic pulverulent materials which do not react with the monomers or polymers under the reaction conditions. Examples of suitable pulverulent materials are quartz powder, talc, alumina, sodium chloride, glass beads and inert polymer granules. Preferably, however, an inert polymer powder is initially taken in the polymerization zone, the composition of the said polymer corresponding to that of the polymer freshly formed from the monomer mixture or from the monomers to be polymerized. Where a polymer powder is not available, these polymers are prepared by a conventional polymerization method, for example by polymerizing the monomers in the absence of a solvent and comminuting the solid polymer, polymerizing the monomers in a water-in-oil emulsion and precipitating and isolating the polymer formed, or by precipitation polymerization or bead polymerization. The particle diameter of the pulverulent materials is from 10 $\mu$m to 20 mm.

The powder state in the polymerization zone is maintained during the entire duration of the polymerization. The monomer solution or emulsion is preferably applied in finely divided form onto the powder in the polymerization zone. This step of the process is carried out, as a rule, by spraying the monomer solution either onto the powder bed or directly in the powder bed. The monomers are introduced into the polymerization zone at the rate at which they undergo polymerization. This can be effected either continuously or batchwise. Adequate circulation of the reaction material should be ensured during the polymerization. The heat evolved during the polymerization and that produced as a result of circulating the powder are removed from the reaction zone by continuously evaporating the solvent or solvent mixture. The concentration of the monomers in the organic solvent is preferably chosen so that, with complete polymerization of the monomers, the liberated enthalpy of polymerization is just sufficient to remove the solvent completely from the polymerization zone by evaporation, under the prevailing reaction conditions.

Suitable ethylenically unsaturated compounds which are polymerized according to the invention are water-soluble or water-swellable and form hydrophilic polymers. Examples are ethylenically unsaturated $C_3$–$C_5$-carboxylic acids, dicarboxylic acids and their anhydrides, such as acrylic acid, methacrylic acid, maleic acid, maleic anhydride, fumaric acid or itaconic acid, the amides of ethylenically unsaturated carboxylic acids, especially acrylamide and methacrylamide, and basic acrylamides and methacrylamides, such as dialkylaminoalkylacrylamides or -methacrylamides, e.g. dimethylaminomethacrylamide, dimethylaminoethylacrylamide and diethylaminoethylacrylamide, esters of ethylenically unsaturated carboxylic acids with amino alcohols, vinylpyrrolidone and its derivatives, vinylimidazole and substituted vinylimidazoles and vinyl sulfones, as well as hydroxy compounds of unsaturated carboxylic acids and carboxylates, e.g. α-hydroxyacrylic acid and hydroxypropyl acrylate. The ethylenically unsaturated carboxylic acids may also be used in the neutralized or partly neutralized form. For example, the ammonium, amine and alkali metal salts, especially the sodium and potassium salts, are suitable. The stated monomers can be subjected to the polymerization either alone or as a mixture; for example it is possible to prepare copolymers of acrylamide and acrylic acid or of methacrylamide, dimethylaminoethyl acrylate and acrylic acid.

However, the polymerization may also be carried out in the presence of ethylenically unsaturated monomers which are only very slightly soluble in water, for example esters of ethylenically unsaturated carboxylic acids and $C_1-C_8$-alcohols, e.g. methyl acrylate, methyl methacrylate and 2-ethylhexyl acrylate, vinyl ethers, acrylonitrile and methacrylonitrile. The amount of this group of monomers which exhibit only limited solubility in water can be up to 75, preferably from 5 to 40, % by weight, based on the copolymers. The only important factor is that the resulting polymers are hydrophilic. The ethylenically unsaturated compounds which are water-soluble may also be copolymerized with compounds which possess two or more ethylenically unsaturated double bonds, so that crosslinked but waterswellable polymers are obtained. Examples of suitable comonomers of this type are butanediol diacrylate, methylenebisacrylamide, divinyldioxane, ethylenedivinylurea and pentaerythritol triallyl ether. The comonomers which effect crosslinking and possess two or more double bonds are used in polymerization in an amount of not more than 5% by weight, based on the total amount of monomers.

The ethylenically unsaturated monomers are dissolved in water or, where the monomers are insoluble in water, are emulsified therein. In order to obtain a stable emulsion of the water-insoluble monomers, it is as a rule necessary to use an emulsifier, for example a nonionic, anionic or cationic emulsifier or a mixture of a nonionic and a cationic emulsifier or of a nonionic and an anionic emulsifier. The amount of the emulsifiers is from 0.1 to 2% by weight, based on the water-insoluble or poorly water-soluble monomers. The aqueous solution or emulsion of the monomers contains from 30 to 90, preferably from 50 to 80, % by weight of one or more monomers.

The polymerization is carried out in the presence of a conventional polymerization initiator. Polymerization initiators which are soluble in water or organic solvents, e.g. hydrogen peroxide, sodium peroxydisulfate, potassium peroxydisulfate or ammonium peroxydisulfate, are preferably used. Other useful initiators are the conventional redox catalyst systems, such as metal salts and peroxides, as well as water-soluble azo compounds, such as 2,2'-azobis-(2-amidinopropane) hydrochloride, and ketone peroxides, e.g. acetylacetone peroxide. For example, from 1 to 20% by weight, based on the monomers, of hydrogen peroxide or the other water-soluble initiators are used. It is also possible to use water-insoluble organic perixodes. Examples of suitable compounds are organic peroxides, such as dialkyl peroxides, perketals, alkyl peresters, diacyl peroxides, peroxydicarbonates and hydroperoxides, azo compounds and C-C-labile compounds, e.g. hexaphenylethane and 2,3-dimethyl-2,3-diphenylbutane. The polymerization can also be effected at a relatively low temperature (room temperature) if the polymerization initiator used is a redox catalyst, e.g. a combination of an organic peroxide with ascorbic acid or a combination of a peroxydicarbonate with benzoin. The polymerization initiators may also be used together with a suitable accelerator. Examples of suitable compounds are amines possessing a cyclic or phenylic parent structure, alone or in the presence of organic transition metal compounds. The polymerization may also be carried out using a mixture of different polymerization initiators which have different decomposition temperatures.

The molecular weight of the polymers can be regulated using the known regulators in conventional amounts. The novel process may be carried out continuously or batchwise. When the process is carried out by a continuous method, the monomer solution or emulsion is fed continuously to the reaction zone together with the initiators and assistants (e.g. regulators), while the polymer being formed flows continuously or at intervals past a weir which forms the boundary of the production zone, in order to pass into the downstream reaction zone. The rate at which polymer is removed from the production zone is about the same as the rate at which monomers are introduced into the reaction zone. To maintain a particular particle size range for the polymer in the polymerization zone, it may be necessary to include an intermediate milling step and to recycle some of the resulting polymer, in the form of a fine-particled product, continuously into the production zone (particle size control).

Depending on the reactivity of the monomers and the activity of the initiator, the polymerization of the monomers can be carried out within a wide temperature range. It is merely important that the powder state is maintained during the polymerization, i.e. the temperature should be not less than 10° C. below the melting point or the beginning of the softening range for the polymer, so that the polymer particles do not stick together. Another obvious precondition is that the temperature is sufficiently high for the particular solvent used to evaporate from the polymerization zone. The polymerization can be carried out under atmospheric pressure, reduced pressure or superatmospheric pressure, for example up to 25 bar, but is preferably effected at from 50° to 150° C. under from 0.1 to 5 bar.

In order to prepare a polymer powder having a particularly low monomer content, the main polymerization is followed by an after-polymerization. For this purpose, a solution of the initiator in an organic solvent, or a 10–50% strength hydrogen peroxide solution in water, is sprayed onto the polymer in the after-reaction zone when the main polymerization is complete.

However, the initiators used for the main polymerization are preferably also used for the after-polymerization.

The after-reaction zone consists of two or more chambers whose limits are defined by baffles whose free cross-section can be altered (weirs).

In the first section of the after-reaction zone, a fairly high speed or the paddle on one shaft results in thorough mixing of initiator in the polymer, and, as in the reaction zone, the solvent or boiling assistant added is removed via one or more appropriate outlet openings so that the powder state of the mixed bed is always maintained. The heat required is supplied via the heated walls or by the enthalpy of reaction of the monomers undergoing subsequent reaction.

The continuous polymerization in the reaction zone results in an increase in the polymer volume and hence in the passage of the solid product through the free cross-section of the weirs, from chamber to chamber, and finally into the chambers of the after-reaction zone and from there, by the same principle, into the further chambers of a heating zone and discharge zone. The two last-mentioned zones likewise contain paddles which are mounted on a longitudinal shaft but, in contrast to the paddles of the reaction zone and of the after-reaction zone, are located on a different shaft and rotate at a lower speed, so that the polymer is subjected to only slight mixing and is transported with a type of plug flow through the chambers with a long residence time and a narrow residence time spectrum, if necessary further initiator solution being sprayed in, solvent being removed in vapor form and further liquid, solid or gaseous substances being added.

The different speeds of the paddles in the reaction zone and after-reaction zone on the one hand and in the heating zone and discharge zone on the other hand are achieved by means of two drives, each of which operates one shaft with paddles from the two sides. The polymer passes from the heating zone through a further weir which can be adjusted from outside and into the discharge zone, from where it can be discharged via a suitable discharging organ, such as a star wheel or periodically through a tubular product separator provided with two ball cocks, under atmospheric pressure. The individual zones can be brought separately to different temperatures.

The invention is described below with reference to the drawings.

Figure 3:
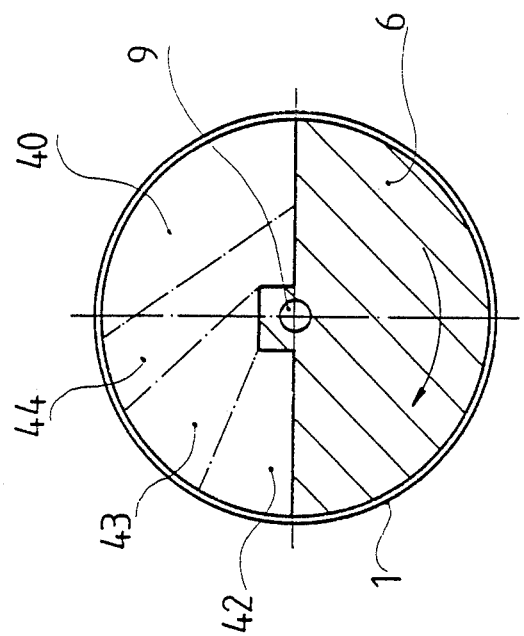
Figure 2:
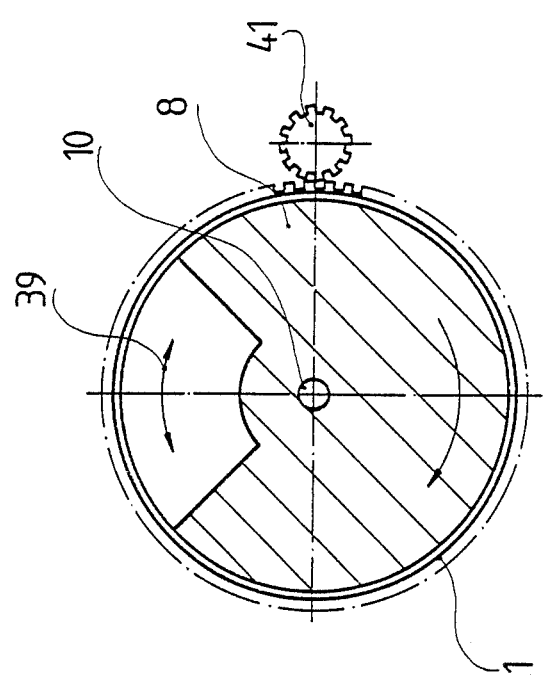

FIG. 1 shows an embodiment of a solid-bed polymerization reactor according to the invention, FIG. 2 shows a section along line 2—2 and FIG. 3 shows a section along line 3—3.

FIG. 1 shows a horizontal solid-bed polymerization reactor 1 which is essentially divided into four zones, i.e. reaction zone 2, after-reaction zone 3, heating zone 4 and discharge zone 5, and each zone can be divided up into two or more chambers by variable weirs. In the simplest case, division is effected by means of three adjustable overflow weirs 6, 7 and 8, the overflow height of weirs 6 and 7 being adjusted by means of fitting elements, while the overflow height of weir 8 can be regulated continuously from outside. The horizontal solid-bed polymerization reactor 1 is heated from outside via the cylindrical surface and the two ends, each zone possessing its own heating system. Shafts 9 and 10 which are operated by the drive units 12 and 14 are inserted into the reactor through the center of the two ends and are mounted in common bearings in weir 7. Paddles 11 which pass close to the walls along all internal surfaces and are staggered by 180° are mounted on shaft 9 so as to permit thorough agitation of the product in the zones 2 and 3 without producing transport over the weirs. The paddles 13 on shaft 10, which pass close to the walls and are staggered by 180°, produce little movement of the product in zone 4 and do not have a transporting effect. In zone 5, the paddles force the product falling over weir 8 into the outlet nozzle 19 and into the transfer tube 15, which is filled and emptied via the valves 27 and 28. The nozzles 17 and 18 are provided for the removal of intermediates and can be equipped with a discharge system of the same design as that in discharge zone 5. In reaction zone 2, transfer tube 30 is provided for discharging product. After the product has passed through a downstream mill, the comminuted product is recycled to zone 2 through recycling nozzle 21 for milled material. The substances (monomers, boiling assistants, regulators and initiators) are fed in via the heatable lance 20. Nozzles 23 and 25 are used for introducing initiators and/or other assistants, nozzle 32 for introducing $N_2$, and nozzles 22, 24 and 26 for removing vapors and inert gases. The temperatures in each zone are measured by means of the PT 100 sensors 33, 34, 35 and 36 mounted in the hollow shafts 9 and 10. The two temperature sensors 37 and 38 measure the shaft temperatures between the particular end face and the associated drive unit, the temperature differences between the measuring points 33 and 34, and 35 and 36, in zones 2 and 3 and zones 4 and 5, respectively, and the measuring points 37 and 38 being a measure of the heat transport along the shafts and hence of the errors in the measurements by the individual temperature sensors. FIGS. 2 and 3 represent sections through the horizontal solid-bed polymerization reactor 1 at points 2—2 and 3—3.

FIG. 2 shows schematically how the overflow opening 39 in weir 8 can be adjusted, by means of external drive 41 through about 360° around the shaft 10 in the solid bed polymerization reactor 1.

FIG. 3 shows schematically how the overflow opening 40 of the weir can be altered in the solid-bed polymerization reactor 1 by means of fitting elements 42, 43 and 44 which can be mounted on the overflow weir 6.

The Examples which follow illustrate the apparatus and the process.

EXAMPLES

The reactor used was a horizontal metal cylinder which had a length of 1140 mm and an internal diameter of 207.6 mm and was equipped with two independently driven shafts on which paddles were fastened at intervals of 100 mm, three weirs with variable free-cross sections as baffles, and a descending condenser. The entire reactor volume was divided into a plurality of differently agitated zones by means of the two drive shafts and the built-in weirs. A spray nozzle passed into the front zone; through this nozzle, the monomer mixture, the initiator solution and the regulator solution were sprayed onto initially taken nylon granules which were mixed thoroughly. A nitrogen line also entered the reactor, in order to permit polymerization to be carried out under a nitrogen atmosphere. The reactor zones were heated with the aid of a plurality of heating cycles. The monomer mixture was mixed with the solution of the polymerization initiator in a static mixer. A heat exchanger was incorporated in the line through which the monomer mixture was fed to the static mixer, so that cooling was possible if required. A separator was installed between the reactor and the descending condenser in order to separate off any solids entrained by the stream of nitrogen, the vaporized excess monomer or the boiling assistant. To check the temperature of the material, the reactor was equipped, in the individual zones, with several temperature probes extending into the material. In order to carry out polymerization and neutralization simultaneously in the reaction zone, either this zone was connected to a solids metering apparatus, for example a metering screw, by means of which pulverulent neutralizing agent was metered into the reaction zone of the reactor, or a second spray nozzle entered this zone and the liquid neutralizing agent was sprayed through this nozzle, likewise onto the initially taken granules.

However, it is also possible to carry out the polymerization in the 1st chamber of the reaction zone, with the neutralization in the 2nd chamber. Furthermore, it is possible to effect only partial neutralization in the first chamber and complete neutralization with the same or another neutralizing agent in the second chamber. The reaction zone possesses, at the bottom, a product outlet through which some of the polymer formed in the reaction zone can be discharged and comminuted in a mill or a roll mill and recycled to the reaction zone in order to ensure that a sufficient number of nuclei are always present for new polymer particles.

The free cross-section of the weir downstream of the reaction zone was adjusted so that about 70% of the chamber volume was filled; the same applies to the chambers of the after-reaction zone. The weir which is downstream of the heating zone and adjustable from outside was also set so that this zone could be maintained about 60–70% full, corresponding to a mean residence time of about 4 hours downstream of the reaction zone.

The drive shaft for the reaction zone and afterreaction zone operated at a speed of 80 rpm, while the drive shaft for the heating zone and discharge zone operated at 25 rpm.

In the Examples parts and percentages are by weight, unless stated otherwise. The K values were measured according H. Fikentscher, Cellulose-Chemie 13 (1932), 48–64 and 71–74, in 1% strength aqueous solution at 25° C.; $K=k.10^3$.

EXAMPLE 1

Preparation of a polymer based on acrylic acid and neutralized with sodium and magnesium ions.

15 kg of a granulated nylon obtained from adipic acid and hexamethylenediamine and having a particle diameter of 2.5–3.5 mm were initially taken in the apparatus described above, blanketed with nitrogen and heated at 140° C. while circulating vigorously.

A solution of 3060 g/hour of acrylic acid and 333 g/hour of water was combined with an initiator solution consisting of 578 g/hour of 50% strength hydrogen peroxide and 366 g/hour of water and with a regulator solution consisting of 293.3 g/hour of 2-mercaptoethanol and 168.6 g/hour of water in a static mixer, and the mixture was sprayed continuously onto the agitated solid. At the same time, a solution of 680 g/hour of sodium hydroxide in 1010 g/hour of water at 80° C. was likewise sprayed uniformly onto the thoroughly agitated surface of the solid in the first chamber of the reaction zone; after the preneutralized polymer had passed the first weir, 462.6 g of 100% pure magnesium oxide, in the form of a solid, were likewise introduced uniformly in the course of 1 hour onto the said polymer in the second chamber of the polymerization zone. The polymerization and neutralization temperature was 140° C. During polymerization, the powder state was maintained in the reaction zone, and the water fed in was distilled off continuously together with the water liberated in the neutralization (about 2000 g of condensate per hour). 1000 g/hour of the freshly formed polymer were discharged continuously via a discharge apparatus, comminuted to 3 mm in a roll mill and recycled to the reaction zone.

To reduce the residual monomer content further, 639.2 g/hour of 50% strength hydrogen peroxide were added continuously to the after-reaction zone of the reactor, the amount of water introduced again being distilled off continuously. The external temperature of the reactor in this zone was adjusted so that an internal temperature of 140° C. was maintained in the powder bed, this also being done in the downstream heating zone, into which a further 319.2 g/hour of hydrogen peroxide were sprayed continuously. After a mean residence time of 4–5 hours, the polymer formed, in the form of a granular product in the discharge zone, was discharged via a tubular product separator controlled by means of a ball cock, against atmospheric pressure. The gas pressure in the entire reactor was about 1.7 bar and was kept constant during the entire operating time by means of a pressure-regulating apparatus. The polymer had a residual monomer content of 0.1% of acrylic acid and possessed a K value of 30 (1% strength in water).

EXAMPLE 2

Preparation of a copolymer based on acrylic acid, styrene and butyl acrylate (90:5:5) and neutralized with sodium and magnesium ions.

15 kg of a dry suspension polymer obtained from sodium acrylate and having a particle diameter of from 1.5 to 3.5 mm were initially taken in the apparatus described above, blanketed with nitrogen and heated at 85° C.

A solution of 72 kg of acrylic acid, 4 kg of styrene, 4 kg of n-butyl acrylate and 12.8 kg of sodium methylate in a solvent mixture consisting of 65 l of methanol and 3.5 l of water was prepared. This was combined with an initiator solution consisting of 0.6 kg of octanoyl peroxide and 1.8 kg of tert-butyl per-2-ethylhexanoate in 24 l of methanol in a static mixer, and the mixture was sprayed in the course of 24 hours in succession onto the agitated initially taken material in the first chamber of the reaction zone, with the aid of a jet lance.

The polymerization temperature in the reaction zone was 85° C. The pressure in the entire reactor was 1 bar. During the polymerization, the powder state was maintained in the reactor. The methanol/water mixture fed in is removed continuously via vapor outlets.

Magnesium oxide (11 kg/24 hours) is introduced continuously into the second chamber of the reaction zone, via a solids metering apparatus, and mixed with the product from the first chamber of the reaction zone.

To reduce the residual monomer content, an initiator mixture consisting of 0.6 kg of octanoyl peroxide in 1.5 l of methanol was dispersed in the course of 24 hours in the after-reaction zone. The temperature in this zone was 95° C.

The product from the after-reaction zone was heated by a further 5° C. to 100° C. in the heating zone, where it was heated for 2.5 hours, with virtually no axial mixing.

The product entering the discharge zone via the weir was cooled to 85° C. and discharged continuously via a transfer tube.

A water-soluble copolymer having a K value of 110 (1% strength in water) and a residual monomer content substantially below 1% was obtained.

EXAMPLE 3

Preparation of a maleic anhydride/vinyl methyl ether copolymer partially esterified with ethanol.

15 kg of a maleic anhydride/vinyl methyl ether copolymer which had been prepared in suspension in benzene and then dried and had a K value of 45 were initially taken, as a particulate solid, in the apparatus described above, blanketed with an inert gas and heated at 70° C. The pressure in the reactor was brought to 5 bar.

3.6 kg/hour of maleic anhydride were first mixed with 10 kg/hour of vinyl methyl ether in a static mixer, the mixture was then mixed with the initiator solution consisting of 0.2 kg/hour of cyclohexyl peroxydicarbonate in 0.8 kg of vinyl methyl ether, and the resulting solution was introduced into the reaction zone continuously via a jet lance.

The polymerization temperature in this zone was 68° C. The powder state was maintained in all zones of the reactor. The excess unpolymerized vinyl methyl ether was removed via a vapor line, condensed outside the reactor and reused in the process.

In the after-reation zone, 1.6 kg/hour of ethanol were added to the product from the reaction zone. The ethanol used contained small amounts of sulfuric acid.

The product from the after-reaction zone, in which thorough radial and axial mixing was carried out, passed via a weir into the heating zone, where virtually exclusively radial mixing was carried out. In the said heating zone, the product was heated at 80° C. until the reaction was complete, this requiring a mean residence time of 2.5 hours.

The product entering the discharge zone via a weir was let down to atmospheric pressure by means of a transfer tube and discharged periodically.

An alternating, alcohol-soluble copolymer consisting of partially esterified maleic acid and vinyl methyl ether and having a K value of 45 (1% strength in cyclohexanone) was obtained. The residual monomer content was less than 0.1% of maleic anhydride.

We claim:

1. A horizontal solid-bed polymerization reactor which is divided into a plurality of zones, comprising a reaction zone, an after-reaction zone, a heating zone and a product discharge zone and said reactor further having inlet and outlet openings for feeding substances into the zones and/or removing substances from the zones, the zones being separated from one another over a part of the reactor cross-section by means of weirs having variable free cross-sections, wherein drive shafts which are independent of one another and possess mixing elements located in the middle of the solid-bed polymerization reactor.

2. A solid-bed polymerization reactor according to claim 1, wherein temperature sensors for the individual zones are mounted in the drive shafts.

3. A solid-bed polymerization reactor according to claim 1, wherein the drive shafts are arranged coaxially.

* * * * *